(12) United States Patent
Kim et al.

(10) Patent No.: US 11,431,010 B2
(45) Date of Patent: Aug. 30, 2022

(54) REDOX FLOW BATTERY HAVING ELECTROLYTE FLOW PATH INDEPENDENTLY PROVIDED THEREIN

(71) Applicant: Standard Energy Inc., Daejeon (KR)

(72) Inventors: Bugi Kim, Sejong (KR); Kihyun Kim, Daejeon (KR); Bumhee Cho, Daejeon (KR); Damdam Choi, Daejeon (KR)

(73) Assignee: Standard Energy Inc., Daejeon (KR)

( * ) Notice: Subject to any disclaimer, the term of this patent is extended or adjusted under 35 U.S.C. 154(b) by 347 days.

(21) Appl. No.: 16/499,187

(22) PCT Filed: Mar. 30, 2018

(86) PCT No.: PCT/KR2018/003828
§ 371 (c)(1),
(2) Date: Aug. 14, 2020

(87) PCT Pub. No.: WO2018/182376
PCT Pub. Date: Oct. 4, 2018

(65) Prior Publication Data
US 2020/0388867 A1     Dec. 10, 2020

(30) Foreign Application Priority Data
Mar. 31, 2017 (KR) .......... 10-2017-0041629

(51) Int. Cl.
*H01M 8/04746* (2016.01)
*H01M 8/04082* (2016.01)
*H01M 8/04276* (2016.01)
*H01M 8/18* (2006.01)

(52) U.S. Cl.
CPC ... *H01M 8/04746* (2013.01); *H01M 8/04201* (2013.01); *H01M 8/04276* (2013.01); *H01M 8/188* (2013.01)

(58) Field of Classification Search
CPC ......... H01M 8/04201; H01M 8/04276; H01M 8/04746; H01M 8/188
USPC ........................................ 429/428
See application file for complete search history.

(56) References Cited

U.S. PATENT DOCUMENTS

| 8,221,911 B2 * | 7/2012 | Kumamoto | ............. H01M 8/20 429/51 |
| 2007/0037034 A1 | 2/2007 | Fisher et al. | |
| 2013/0177789 A1 * | 7/2013 | Kampanatsanyakorn | ................... H01M 8/188 429/70 |

(Continued)

FOREIGN PATENT DOCUMENTS

| JP | 2006-093016 | 4/2006 |
| JP | 2009-016218 | 1/2009 |

(Continued)

OTHER PUBLICATIONS

International Search Report dated Jul. 24, 2018 in PCT Application No. PCT/KR2018/003828.

*Primary Examiner* — James M Erwin
(74) *Attorney, Agent, or Firm* — Knobbe, Martens, Olson & Bear, LLP

(57) ABSTRACT

The present invention relates to a redox flow battery having at least one battery module which consists of a battery cell, an electrolyte tank, an electrolyte flow path, a fluid control unit, and a pressure generating unit, wherein each of the battery modules is charged and discharged by independently circulating an electrolyte.

11 Claims, 8 Drawing Sheets

(56) References Cited

U.S. PATENT DOCUMENTS

| | | | | |
|---|---|---|---|---|
| 2014/0060666 A1* | 3/2014 | Evans | ............. | H01M 50/60 |
| | | | | 137/260 |
| 2015/0349357 A1 | 12/2015 | Braithwaite et al. | | |
| 2016/0141698 A1* | 5/2016 | Huang | ............. | H01M 8/188 |
| | | | | 429/108 |
| 2016/0308233 A1* | 10/2016 | Liu | ............. | H01M 8/188 |
| 2016/0308234 A1* | 10/2016 | Reece | ............. | H01M 8/04276 |

FOREIGN PATENT DOCUMENTS

| | | |
|---|---|---|
| KR | 10-2000-0012125 | 2/2000 |
| KR | 10-2002-0093929 | 12/2002 |
| KR | 10-2007-0087120 | 8/2007 |
| KR | 10-2011-0119775 | 11/2011 |
| KR | 10-1176126 | 8/2012 |
| KR | 10-2013-0140342 | 12/2013 |
| KR | 10-1394255 | 5/2014 |
| KR | 10-2015-0047529 | 5/2015 |
| KR | 10-2017-0005630 | 1/2017 |
| KR | 10-1803825 | 12/2017 |
| KR | 10-1803824 | 1/2018 |
| WO | WO 2018/182376 A1 | 10/2018 |

* cited by examiner

REDOX FLOW BATTERY HAVING ELECTROLYTE FLOW PATH INDEPENDENTLY PROVIDED THEREIN

TECHNICAL FIELD

The present invention relates to a redox flow battery having an electrolyte flow path independently provided therein.

More specifically, the present invention relates to a redox flow battery having an electrolyte flow path independently provided therein, the redox flow battery forming a closed circuit consisting of a battery cell, an electrolyte tank, and an electrolyte flow path through which the electrolyte flows, and having a fluid control unit provided in the electrolyte flow path in which an electrolyte solution for transferring from the electrolyte tank to the battery cell, thereby reducing the reaction time, minimizing the occurrence of shunt current, and improving the efficiency.

BACKGROUND ART

Recently, renewable energy, such as solar energy and wind energy, has been spotlighted as a method of suppressing greenhouse gas emission, which is a major cause of global warming, and much research is being carried out for practical use thereof. However, renewable energy is greatly affected by the site environment and natural conditions. Moreover, there is a disadvantage in that renewable energy cannot supply energy evenly continuously because the output fluctuates severely. Therefore, in order to produce renewable energy for use in homes or commercially, a system that stores energy when the output is high and uses the stored energy when the output is low is being used.

A large capacity secondary battery is used as such an energy storage system. For example, the large capacity secondary battery storage system is introduced in a large-scale photovoltaic and wind plant. The secondary battery for storing a large amount of power includes a lead acid battery, a sodium sulfide (NaS) battery, a redox flow battery (RFB), and the like.

These redox flow batteries have features of operating at room temperature and enabling independent design of capacity and output, and thus much research thereon has been conducted as large capacity secondary batteries.

The redox flow battery is provided so that a membrane, an electrode, and a bipolar plate are arranged in series to form a stack, and functions as a secondary battery capable of charging and discharging electrical energy. The redox flow battery is provided so that the anode and cathode electrolytes supplied from the anode and cathode electrolyte storage tanks on both sides of the bipolar plate are circulated to perform ion exchanges, and in this process, the movements of the electrons occur to perform charging and discharging. Such a redox flow battery is known to be most suitable for an energy storage system (ESS) because the redox flow battery has a longer lifespan compared with the existing secondary battery and can be manufactured in all medium and large systems of kW to MW class.

However, the redox flow battery is configured so that the tanks for storing the anode and cathode electrolytes are separately arranged at a predetermined spacing (for example, the electrolyte tanks are arranged at a predetermined spacing in both sides or the bottom of the stack). Due to the electrolyte circulation pipe connecting the tank and the electrolyte tank, there is a disadvantage in that the overall volume of the system is relatively large compared to other power storage devices such as lead acid batteries, lithium ion batteries, and lithium-sulfur batteries having a similar power storage capacity.

In addition, since a plurality of electrolyte circulation tubes are connected to the stack, the pump and the electrolyte tank must be provided, and a pump capacity of a certain level or more is required to supply electrolyte to each stack uniformly. There are problems that as the length of the electrolyte circulation tube is increased, the required capacity of the pump is increased so that the size of the pump and the manufacturing cost of the battery are increased, and as the power consumption is increased due to the increase in the pump capacity, the overall battery efficiency is reduced.

In addition, the general battery should have fast response to the charging and discharging operation. However, when the redox flow battery is operated for charging and discharging in a stopped state, it takes time for the electrolyte to circulate into the stack using the pump, whereby there are problems that the response is delayed as much as the required time and the cost increases because a large amount of chemical-resistant piping is required to connect the cell, the stack, and the pump.

Here, a typical redox flow battery is provided so that the electrolyte is supplied to each battery cell through a manifold. However, the electrolyte filled in the manifold serves as an electric path connecting each cell, which may be a path of electron movement. Through this path, a shunt current is generated, and a part of the energy is lost due to the shunt current during charging and discharging, which results in the main cause of reduced efficiency, component damage, and uneven cell performance. The method of increasing the manifold length and narrowing the cross-sectional area has been mainly adopted to reduce the shunt current in the related art. However, since the method increases the flow resistance of the fluid and generates the pumping loss, there is a need for a method to overcome the same.

DISCLOSURE

Technical Problem

The present invention has been made keeping in mind the above problems occurring in the related art, and an objective of the present invention is to provide a redox flow battery having an electrolyte flow path independently provided therein, the redox flow battery forming a closed circuit consisting of a battery cell, an electrolyte tank, and an electrolyte flow path through which the electrolyte flows, and having a fluid control unit provided in the electrolyte flow path for transferring the electrolyte solution from the electrolyte tank to the battery cell, thereby reducing the reaction time, minimizing the occurrence of shunt current, and improving the efficiency.

In addition, another objective of the present invention is to provide a redox flow battery having an electrolyte flow path independently provided therein, in which an electrolyte transfer impeller that circulates the electrolyte using the centrifugal force and a fluid transfer impeller that receives the pressure from the pressure generating unit to be rotated are provided in each chamber, and are connected to each other by the shaft to share the rotational force, whereby the electrolyte is transferred by rotating the electrolyte transfer impeller under the pressure of the pressure generating unit.

In addition, another objective of the present invention is to provide a redox flow battery having an electrolyte flow path independently provided therein, in which a space in which a fluid transfer impeller and an electrolyte transfer impeller are provided is divided into an electrolyte transfer chamber and a fluid transfer chamber by a partition, and a through-hole is formed in the partition through which the shaft passes, and the watertight member is provided in the through hole, whereby the fluid is prevented from moving to the electrolyte flow path, and the electrolyte flowing through the electrolyte flow path is also prevented from moving to the fluid transfer chamber, thereby enabling a sealed structure.

Technical Solution

In order to achieve the above objectives, a redox flow battery having an electrolyte flow path independently provided therein according to the present invention is configured to have one or more battery modules including a battery cell, an electrolyte tank, an electrolyte flow path, and a fluid control unit, in which each of the battery modules is charged and discharged by independently circulating an electrolyte.

Advantageous Effects

According to the present invention, there is an advantage that the redox flow battery forms a closed circuit consisting of a battery cell, an electrolyte tank, and an electrolyte flow path through which the electrolyte flows, and has a fluid control unit provided in the electrolyte flow path for transferring the electrolyte solution from the electrolyte tank to the battery cell, thereby reducing the reaction time, minimizing the occurrence of shunt current, and improving the efficiency.

In addition, there is an advantage that the electrolyte transfer impeller that circulates the electrolyte using centrifugal force and the fluid transfer impeller that receives the pressure from the pressure generating unit to be rotated are provided in each chamber, and are connected to each other by the shaft to share the rotational force, whereby the electrolyte can be transferred by rotating the electrolyte transfer impeller under the pressure of the pressure generating unit.

In addition, according to the present invention, a space in which a fluid transfer impeller and an electrolyte transfer impeller are provided is divided into an electrolyte transfer chamber and a fluid transfer chamber by a partition, and a through-hole is formed in the partition through which the shaft passes, and the watertight member is provided in the through hole, whereby the fluid can be prevented from moving to the electrolyte flow path, and the electrolyte flowing through the electrolyte flow path can be also prevented from moving to the fluid transfer chamber, thereby enabling a sealed structure.

DESCRIPTION OF MAJOR NUMERALS IN DRAWINGS

Figure 1:
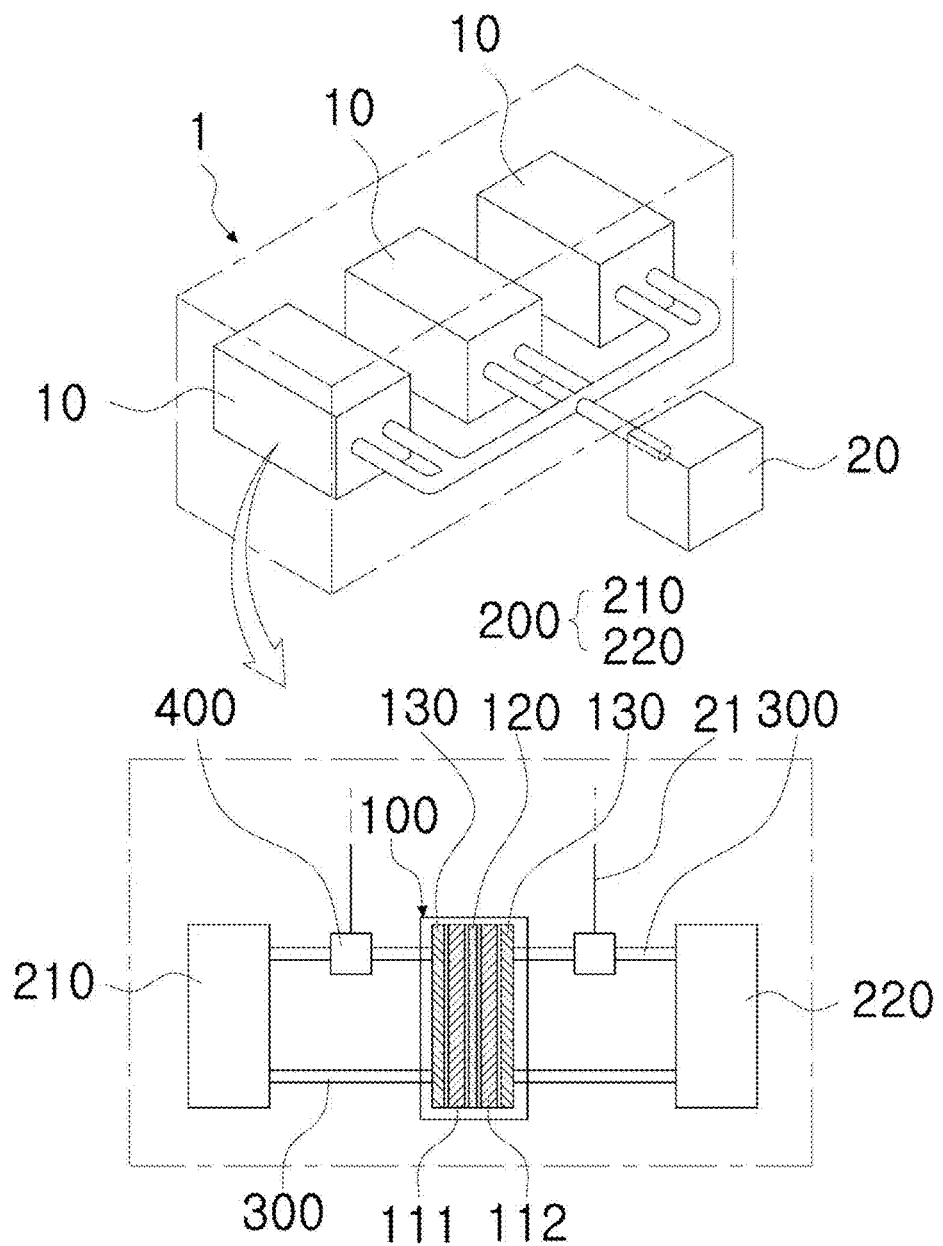
FIG. 1 is a view illustrating an example in which multiple battery modules are provided in a redox flow battery having an electrolyte flow path independently provided therein according to the present invention.

1: stack 10: battery module
100: battery cell 110: electrode
111: positive electrode 112: negative electrode
120: membrane 130: bipolar plate
200: electrolyte tank 210: anode electrolyte tank
220: cathode electrolyte tank 300: electrolyte flow path
400: fluid control unit 410: partition
411: through hole 420: fluid transfer chamber
421: fluid transfer impeller 430: electrolyte transfer chamber
431: electrolyte transfer impeller 435: shaft
440: watertight member 450: fluid filter
20: pressure generating unit 21: fluid transfer pipe
30: module connection part

BEST MODE

Advantages and features of the embodiments of the present invention, and methods of achieving them will be apparent with reference to the embodiments described below in detail with the accompanying drawings. However, the present invention is not limited to the embodiments disclosed below, but can be implemented in various different forms. The embodiments are to make the disclosure of the present invention complete and are provided to fully inform the scope of the invention to those skilled in the art to which the present invention pertains. The invention is defined only by the scope of the claims. Like reference numerals refer to like elements throughout.

Upon describing the embodiments of the present invention, if it is determined that a detailed description of a known function or configuration may unnecessarily obscure the gist of the present invention, the detailed description thereof will be omitted. Terms and words used in the present specification and claims are terms defined in consideration of functions in the embodiments of the present invention, and should not be construed as being limited to ordinary or dictionary meanings. It should be interpreted as meaning and having a concept corresponding to the technical idea of the present invention based on the principle that the concept of the term can be properly defined in order to explain in the best way.

Therefore, since the embodiments described in the present specification and the configuration shown in the drawings are only the most preferred embodiments of the present invention and do not represent all of the technical idea of the present invention, it should be understood that there may be various equivalents and variations capable of being substituted therefor at the time of the present application.

Before describing the present invention with reference to the drawings, it should be appreciated that matters that are not necessary to reveal the gist of the present invention, that is, well-known configurations that could be obviously added by those skilled in the art will not be shown or described in detail.

A redox flow battery having an electrolyte flow path independently provided therein according to the present invention is devised to overcome a problem that the length of the electrolyte circulation tube is increased and thus the volume of the battery itself is increased, which is a disadvantage of the redox flow battery, a physical problem that a high performance pump is required or the number of pumps is increased, a problem that the size of the pump and the manufacturing cost of the battery are increased due to the transfer of electrolyte, and a problem that the responsiveness is reduced and pumping loss occurs, the redox flow battery having multiple battery modules 10 consisting of a battery cell 100, an electrolyte tank 200, an electrolyte flow path 300, and having a fluid control unit 400 provided in the electrolyte flow path 300 that transfers the electrolyte from the electrolyte tank 200 to the battery cell 100, by which each of the multiple battery modules 10 may be charged and discharged by independently circulating the electrolyte. Thus, the present invention can significantly reduce the moving distance of the electrolyte, and can efficiently solve problems such as responsiveness degradation, pumping loss, and the like.

First, a battery cell 100 configured in a battery module 10 in the present specification means a minimum unit in which charging and discharging are performed through electrolyte.

In addition, a stack 1 herein means that multiple battery cells 100 are stacked or configured.

Hereinafter, with reference to the accompanying drawings, the redox flow battery having an electrolyte flow path independently provided therein according to the present invention will be described.

Figure 2:
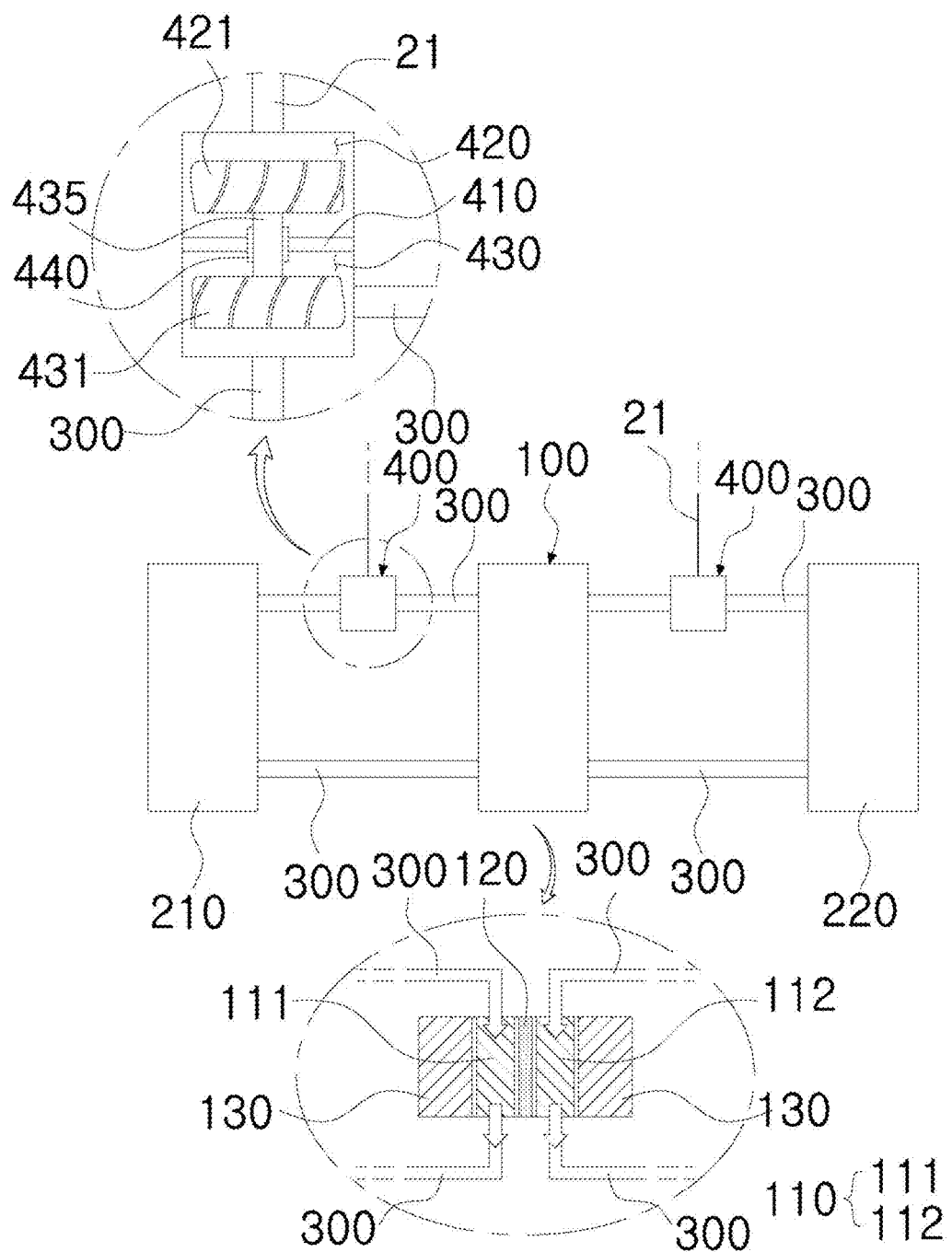
FIG. 2 is a view illustrating an internal structure of the battery module in a redox flow battery having an electrolyte flow path independently provided therein according to the present invention.
Figure 3:
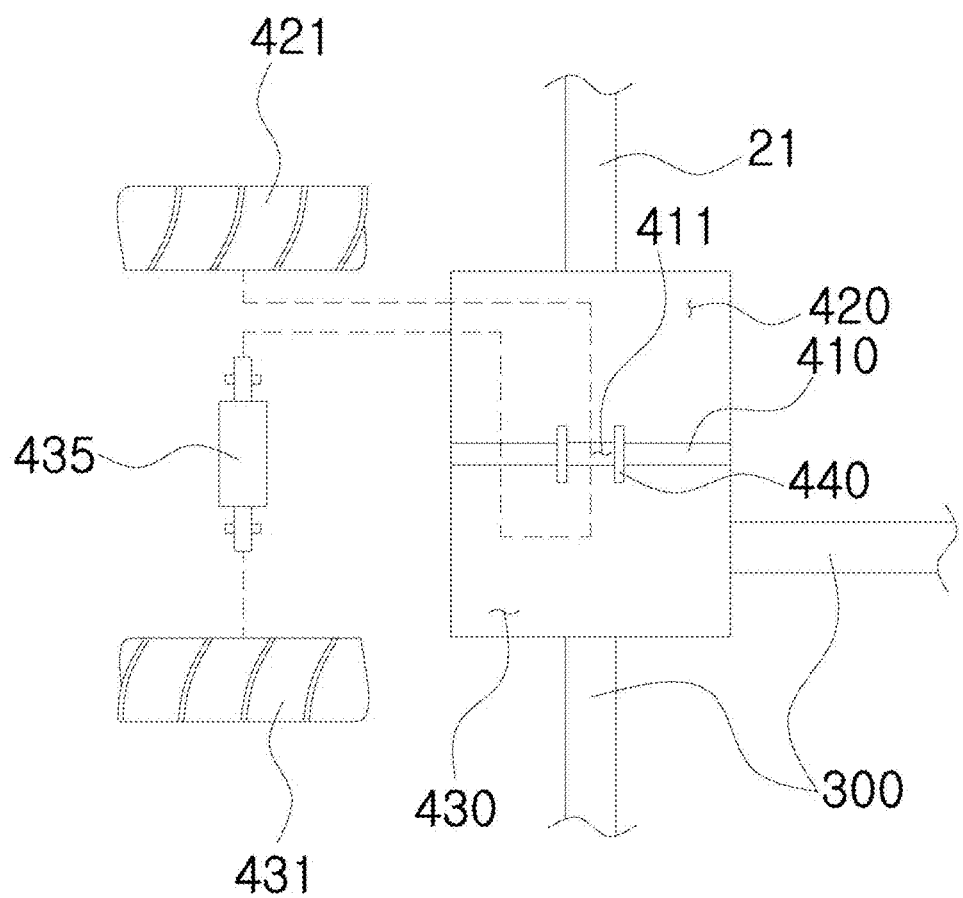
FIG. 3 is a view illustrating an internal structure of a fluid control unit in a redox flow battery having an electrolyte flow path independently provided therein according to the present invention.
Figure 4:
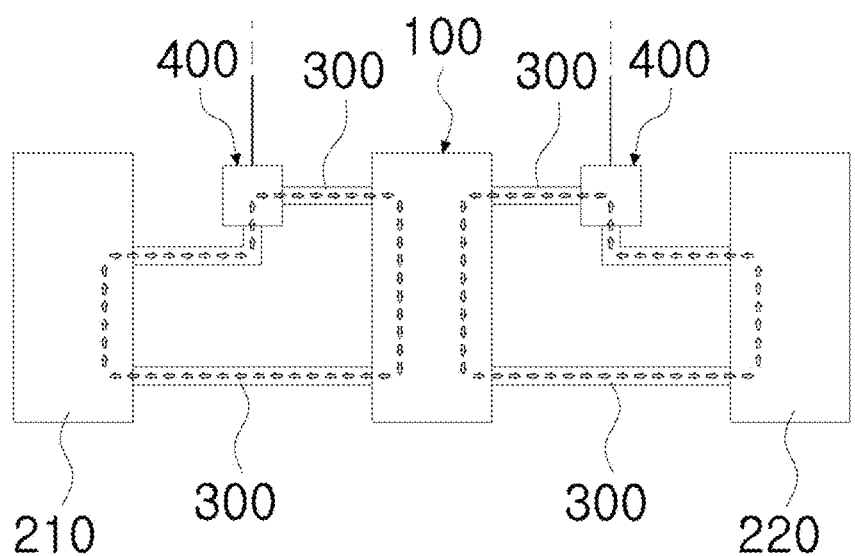
FIG. 4 is a view illustrating an example in which the electrolyte is circulated by operation of a fluid control unit in a redox flow battery having an electrolyte flow path independently provided therein according to the present invention.

FIG. 1 is a view illustrating an example in which multiple battery modules are provided in a redox flow battery having an electrolyte flow path independently provided therein according to the present invention; FIG. 2 is a view illustrating an internal structure of the battery module in a redox flow battery having an electrolyte flow path independently provided therein according to the present invention, FIG. 3 is a view illustrating an internal structure of a fluid control unit in a redox flow battery having an electrolyte flow path independently provided therein according to the present invention; and FIG. 4 is a view illustrating an example in which the electrolyte is circulated by operation of a fluid control unit in a redox flow battery having an electrolyte flow path independently provided therein according to the present invention.

FIGS. 1 and 2 are schematic structural diagrams illustrating the structure of a redox flow battery having an electrolyte flow path independently provided therein according to the present invention. Referring to FIGS. 1 and 2, a stack 1 is configured to include one or more battery modules 10 and a pressure generating unit 20, in which each battery module 10 includes a battery cell 100, an electrolyte tank 200, electrolyte flow path 300, and fluid control unit 400.

With reference to FIG. 2, the battery cell 100 includes the membrane 120 interposed between the positive electrode 111 and the negative electrode 112 composing a pair of electrodes 110, and a bipolar plate 130 spaced apart from the outside of the electrode 110. The battery cell 100 has a flow path formed therein so that the cathode electrolyte and the cathode electrolyte are alternatively supplied.

That is, when the electrolyte is transferred by the operation of a fluid control unit 400 which will be described later, the electrolyte is transferred from the electrolyte tank 200 to the battery cell 100 through the electrolyte flow path 300 to be circulated.

Through this circulation process, it is possible to perform charging and discharging.

The electrolyte tank 200 is provided inside the battery module 10, connected to the battery cell 100 via the electrolyte flow path 300 which will be described later, and configured to include an anode electrolyte tank 210 in which the anode electrolyte solution is circulated and a cathode electrolyte tank 220 in which the cathode electrolyte is circulated.

As shown in FIGS. 1 and 2, the electrolyte flow path 300 connects the battery cell 100 with the electrolyte tank 200 to provide a space that allows the electrolyte to flow, and specifically a pair of flow paths is provided so that the anode electrolyte and the cathode electrolyte may be supplied and discharged between the anode electrolyte tank 210 and the battery cell 100 and between the cathode electrolyte tank 220 and the battery cell 100, respectively.

Thus, the anode electrolyte of the anode electrolyte tank 210 is supplied to the battery cell 100 along one of the pair of flow paths, and then the anode electrolyte passing through the battery cell 100 is discharged along the other flow path and introduced into the anode electrolyte tank 210, thereby allowing the anode electrolyte to be circulated.

In addition, the cathode electrolyte of the cathode electrolyte tank 220 is supplied to the battery cell 100 along one of the pair of flow paths, and then the cathode electrolyte passing through the battery cell 100 is discharged along the other flow path and introduced into the cathode electrolyte tank 220, thereby allowing the cathode electrolyte to be circulated.

Meanwhile, the electrolyte charged and discharged via reaction performed in the battery cell 100 is made of a variety of types, in which the cathode electrolyte and the anode electrolyte may be mixed with each other for the purpose of capacity recovery or improvements of management or performance in the electrolyte. Herein, the electrolyte flow path 300 through which the anode electrolyte flows and the electrolyte flow path 300 through which the cathode electrolyte flows may be provided to be partially crossed each other so that the anode electrolyte and the cathode electrolyte are mixed with each other.

Furthermore, a separate valve structure may be further provided so that a pair of electrolyte flow paths 300 may cross each other, and the anode electrolyte tank 210 and the cathode electrolyte tank 220 are configured to be partially connected to each other, depending on the design conditions.

As such, the battery cell 100 including the positive electrode 111, the negative electrode 112, the membrane 120, and the bipolar plate 130 is provided so that an anode electrolyte and a cathode electrolyte circulated from the anode electrolyte tank 210 and the cathode electrolyte tank 220 electrochemically react with each other in the battery cell 100, whereby charging or discharging is performed. However, in the present invention, the battery cell 100 is described and illustrated on the basis of a typical redox flow battery, and the electrode 110, the membrane 120, or the bipolar plate 130 may be omitted according to design conditions.

Herein, the circulating of the anode electrolyte or the cathode electrolyte may be performed by the operation of the fluid control unit 400 using the centrifugal force.

Referring to FIGS. 3 and 4, the fluid control unit 400 is provided in the electrolyte flow path 300 to perform a function of controlling the flows of the anode electrolyte and the cathode electrolyte. The fluid control unit 400 is formed in a housing shape having a space therein, and includes a partition 410, a fluid transfer chamber 420, an electrolyte transfer chamber 430, and a watertight member 440.

As shown in the accompanying drawings, the fluid control unit 400 is provided in one of the pair of flow paths connecting the anode electrolyte tank 210 and the battery cell 100 and one of the pair of flow paths connecting the cathode electrolyte tank 220 and the battery cell 100, thereby allowing the anode electrolyte and the cathode electrolyte to be transferred and circulated, respectively.

Herein, according to the present invention, the fluid control unit 400 is configured to transfer the anode electrolyte and cathode electrolyte by means of a centrifugal force, and the electrolyte may be transferred in the electrolyte flow path independently provided so that the cathode electrolyte and anode electrolyte are continuously circulated, and furthermore, each battery module 10 may be driven independently.

Hereinafter, the fluid control unit 400 will be described in detail with reference to FIGS. 3 and 4. The partition 410 serves to partition an internal space of the fluid control unit 400 and is configured to have a through hole 411 which communicates the partitioned space to each other.

The partition 410 divides the internal space of the fluid control unit 400 into a fluid transfer chamber 420 and an electrolyte transfer chamber 430 which will be described later, and a shaft 435 is provided passing through the through hole 411, the shaft 435 connecting a fluid transfer impeller 421 provided in the fluid transfer chamber 420 and an electrolyte transfer impeller 431 provided in the electrolyte transfer chamber 430 to each other.

Herein, the shaft 435 is a means that allows the fluid transfer impeller 421 and the electrolyte transfer impeller 431 to share the rotational force, and may be configured with a gear or link structure capable of transferring the driving force, alternatively.

According to the present specification, an example is described in which a pair of fluid control units 400 is provided when each of the anode electrolyte and cathode electrolyte circulates, but the present invention is not limited thereto. Each of electrolyte transfer impellers 431 used for the transfer of each of the anode electrolyte and the cathode electrolyte may be connected to one shaft 435 and operated simultaneously.

The fluid transfer chamber 420 forms a space partitioned by a partition 410, is connected to a pressure generating unit 20, which will be described later, through the fluid transfer pipe 21, and has the fluid transfer impeller 421 provided therein.

In addition, the fluid transfer impeller 421 is configured so that the pressure generated from the pressure generating unit 20 is transmitted through the fluid transfer pipe 21, whereby the fluid transfer impeller 421 is rotated in the fluid transfer chamber 420.

Herein, the compression of the fluid to deliver the pressure occurs in the pressure generating unit 20, in which the pressure generating unit 20 may be composed of a compressor, a pump, a vacuum pump, or the like, and a type of fluid may be used with a gas, liquid, and the like.

That is, the pressure generating unit 20 may be any device as long as the device generates and transmits pressure, and a type of fluid is not limited in the present invention. Furthermore, since the structure and function of the pressure generating unit 20 will be well known to those skilled in the art to which the present invention pertains, it will not be described separately herein.

Figure 5:
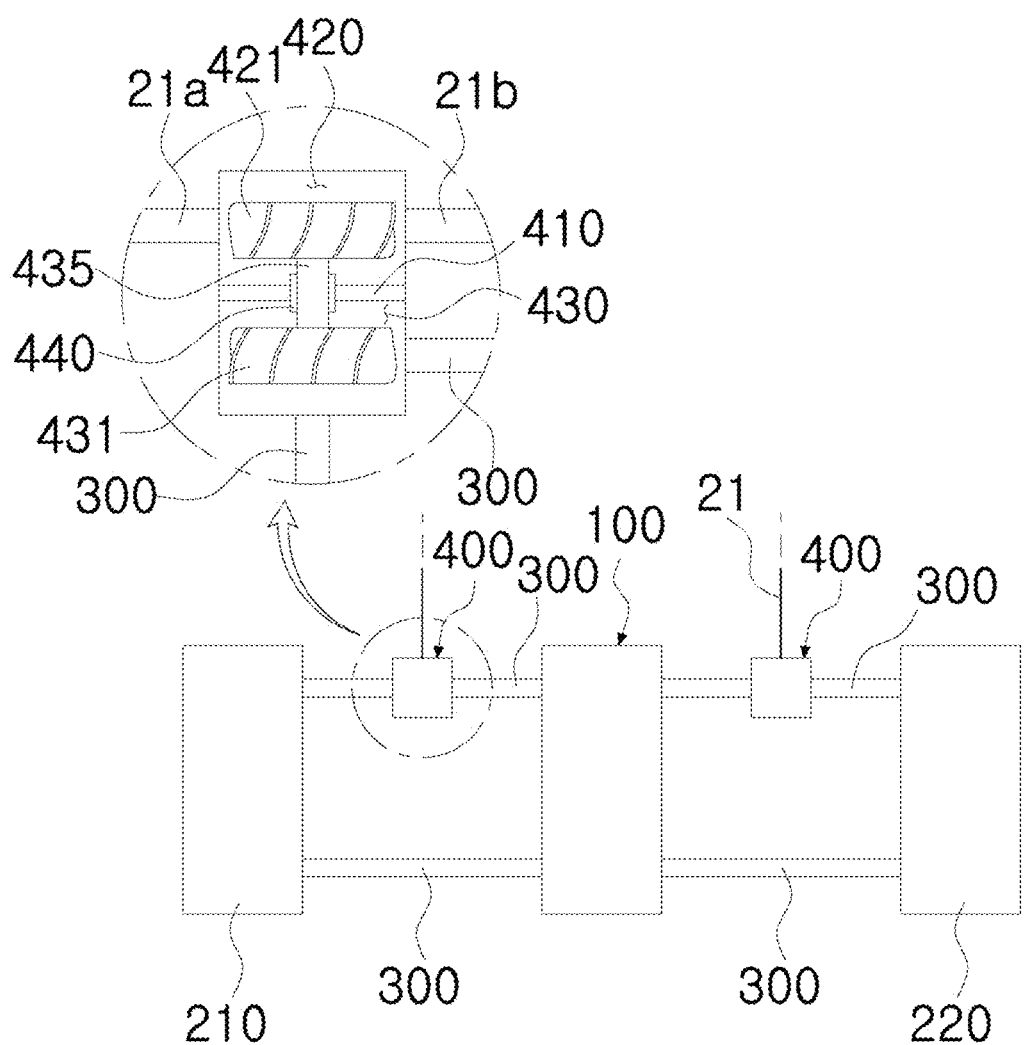
FIG. 5 is a view illustrating an example in which the fluid is supplied and discharged in a redox flow battery having an electrolyte flow path independently provided therein according to the present invention.

Here, the fluid transfer pipe 21 connecting the pressure generating unit 20 and the fluid transfer chamber 420 may be configured to have the inlet pipe 21a into which the fluid flows and the discharge pipe 21b from which the fluid discharges, as shown in FIG. 5.

Depending on the design conditions, the pressure generating unit 20 may be configured to simultaneously generate pressure and vacuum, which are supplied to the fluid control unit 400 using both the positive pressure and the negative pressure. By transferring the positive pressure using the supplied pressure while transferring the negative pressure using the generated vacuum, when operated by the positive pressure and the negative pressure transferred to the fluid transfer chamber 420, a fluid transfer impeller 421 provided in the fluid transfer chamber 420 obtains a relatively larger rotational force than operated by one selected of the positive pressure or negative pressure, thereby improving the efficiency.

Furthermore, by using both positive pressure and negative pressure, it is possible to use the pressure transfer fluid of the pressure generating unit 20 in a closed circuit.

In addition, the pressure generating unit 20 may be provided with a separate supply device (not shown in the drawings) to compensate for the fluid lost during operation, a pressure meter (not shown) that measures the pressure in real time for the operation of such a supply device may be also provided.

In this case, when the pressure meter measures that the pressure transferred to the fluid control unit 400 is lower than the reference value due to a loss of pressure, it is possible to supplement the lost pressure through the supply device. On the contrary, when the pressure meter measures that the pressure is measured higher than the reference value, a device for discharging the pressure to the outside is further provided so that the pressure generated in the pressure generating unit 20 may be smoothly transferred to the fluid control unit 400 on the basis of the reference value.

According to this configuration, when using a fluid that transmits the pressure in a closed circuit, it is possible to minimize the oxygen in the air in contact with the electrolyte, and since a fluid suitable for the operation of the pressure generating unit 20 is selectively used, it is possible to improve the working efficiency.

In addition, with reference to FIG. 1, the pressure generating unit 20 is connected to a plurality of battery modules 10 by the fluid transfer pipe 21 to supply pressure, wherein a separate valve (not shown) may be provided in the fluid transfer pipe 21 connected to each of the battery modules 10.

Such a valve is to control the path through which pressure transfers, the pressure being generated from the pressure generating unit 20 and then supplied to the fluid control unit 400, and the pressure supplied from the pressure generating unit 20 may be supplied only to the battery module selected from multiple battery modules 10 through the manipulation of the valve.

The electrolyte transfer chamber 430 forms another space partitioned by the partition 410, provides a space in which the electrolyte may stay via the connection to the electrolyte flow path 300, and has the electrolyte transfer impeller 431 provided therein.

As described above, the electrolyte transfer impeller 431 is connected to the fluid transfer impeller 421 provided in the fluid transfer chamber 420 via the shaft 435 passing through the through hole 411 formed in the partition 410, thereby sharing the rotational force.

When the fluid transfer impeller 421 is rotated by the pressure transmitted from the pressure generating unit 20, the electrolyte transfer impeller 431 configured to share the rotational force is rotated together so that the electrolyte is transferred along the electrolyte flow path 300 through the principle that the electrolyte flow path may be independently provided.

As such, when the electrolyte is transferred, the anode electrolyte and the cathode electrolyte are circulated to pass through the battery cell 100, so that each of multiple battery modules 10 provided in the stack 1 may be independently charged and discharged.

Preferably, the fluid staying in the fluid transfer chamber 420 and the electrolyte staying in the electrolyte transfer chamber 430 is prevented from mixing with each other, and a watertight member 440 may be provided in the through hole 411 communicating the fluid transfer chamber 420 and the electrolyte transfer chamber 430 so that the battery cell 100, the electrolyte tank 200, and electrolyte flow path 300 through which the electrolyte is circulated form a closed circuit.

The watertight member 440 serves to make the through hole 411 be watertight with the outer peripheral surface of the shaft 435 which passes through the through hole 411 to be rotatable, in which various watertight structures provided in the centrifugal pump may be applied.

For example, the watertight structure may be configured with one or more selected of the bearing or retainer, and may be provided with various seal structures that may prevent the outflow of fluid and electrolyte.

Figure 6:
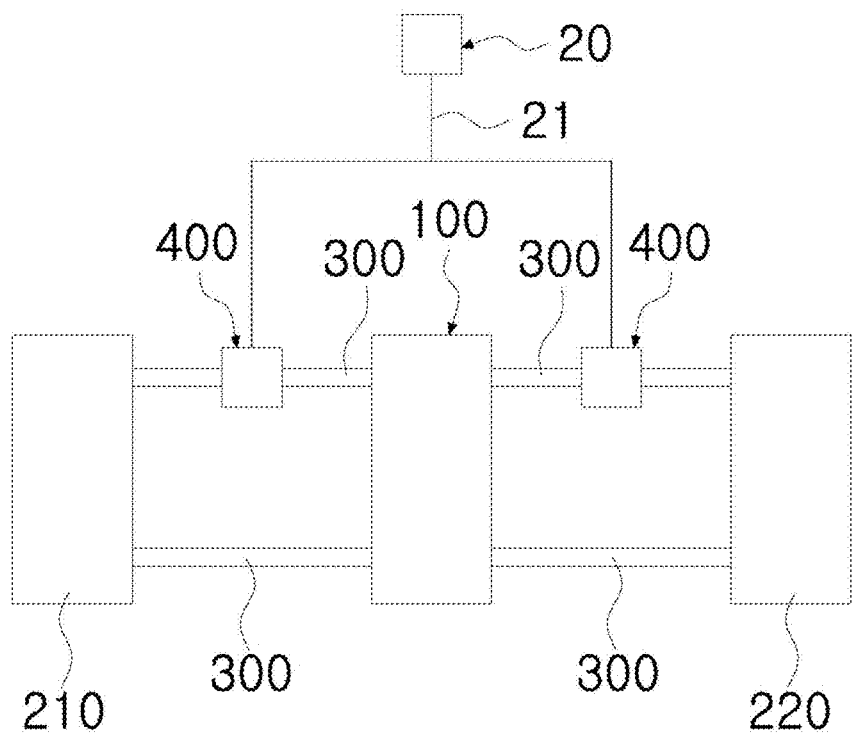
FIG. 6 is a view illustrating an example in which a pressure generating unit is provided in each of multiple battery modules in a redox flow battery having an electrolyte flow path independently provided therein according to the present invention.

Meanwhile, although an example in which one pressure generating unit 20 is provided in a stack 1 composing of multiple battery modules 10 is described referring to FIGS. 1 to 5, the pressure generating unit 20 may be independently provided in each of the battery modules 10, as shown in FIG. 6.

Furthermore, the pressure generating unit 20 may be provided to supply pressure to multiple battery modules 10. For example, when nine battery modules 10 are provided in the stack 1, one pressure generating unit 20 is provided for three battery modules 10 to supply the pressure to the three battery modules 10.

As shown in FIG. 6, when the pressure generating unit 20 is provided in each of the battery modules 10, the battery module 10 is operated so that charging and discharging function may be operated more reliably and independently.

That is, when operating the battery module 10 selected of multiple battery modules 10, the battery module 10 may be charged and discharged independently by operating the pressure generating unit 20 connected to the battery module 10.

Figure 7:
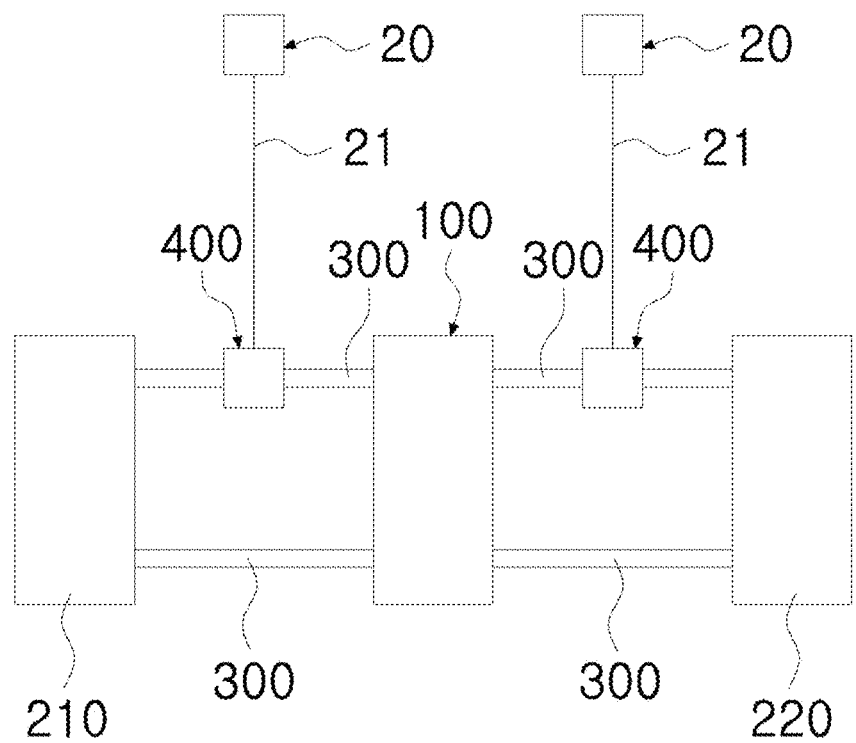
FIG. 7 is a view illustrating an example in which pressure generating units are provided to operate each of a pair of fluid control units provided in each of multiple battery modules in a redox flow battery having an electrolyte flow path independently provided therein according to the present invention.

According to the design conditions, as shown in FIG. 7, a pair of pressure generating units 20 is provided in one battery module to operate each of a pair of fluid control units 400 provided in each of the battery modules 10.

That is, the pressure generating units 20 may be provided in each of a pair of fluid control units 400, so as to control the circulation of each of the anode electrolyte and the circulation of the cathode electrolyte, whereby the process in which the cathode electrolyte and the anode electrolyte are circulated may be individually controlled, thereby enabling efficient operation.

In addition, by separately controlling the circulations of the anode electrolyte and the cathode electrolyte, when a problem occurs in the circulating process of the anode electrolyte or the cathode electrolyte, it is easy to recognize whether the portion where the problem occurs is the anode side or the cathode side, and it is possible to check and maintain the configuration of the anode side or the cathode side where the problem occurs by operating the pressure generating unit 20.

According to this configuration, the redox flow battery having the electrolyte flow path independently provided therein according to the present invention is provided so that a battery cell 100, an electrolyte tank 200 and an electrolyte flow path 300 form a closed circuit, through which the electrolyte flows, and a fluid control unit 400 is provided in the electrolyte flow path 300 for transferring the electrolyte from the electrolyte tank 200 to the battery cell 100, thereby reducing the reaction time, improving the efficiency, and minimizing the occurrence of shunt current.

In addition, the electrolyte transfer impeller 431 for circulating the electrolyte using the centrifugal force and the fluid transfer impeller 421 receiving the pressure from the pressure generating unit to be rotated is provided in each chamber, the electrolyte transfer impeller 431 and the fluid transfer impeller 421 being connected by the shaft 435 to share the rotational force. Therefore, the electrolyte transfer impeller 431 is rotated by the pressure of the pressure generating unit 20 to cause movement of the electrolyte to be continuously performed.

In addition, the space where the electrolyte transfer impeller 431 and the fluid transfer impeller 421 are provided is divided into the fluid transfer chamber 420 and the electrolyte transfer chamber 430 by the partition 410, in which the partition 410 has a through hole 411 through which the shaft 435 passes. The watertight member 440 is provided in the through hole 411, so that the fluid may be prevented from moving to the electrolyte flow path, and the electrolyte flowing through the electrolyte flow path 300 may also be prevented from moving to the fluid transfer chamber 420, thereby enabling a sealed structure.

Meanwhile, although an example is described in which the redox flow battery having the electrolyte flow path independently provided therein according to the present invention is configured so that the battery cell 100, the electrolyte tank 200, the electrolyte flow path 300, and the fluid control unit 400 are independently provided, the electrolyte tank 200 and the fluid control unit 400 may be provided to be used in common and multiple battery cells 100 may be provided.

This will be described in detail with reference to FIG. 8.

Figure 8:
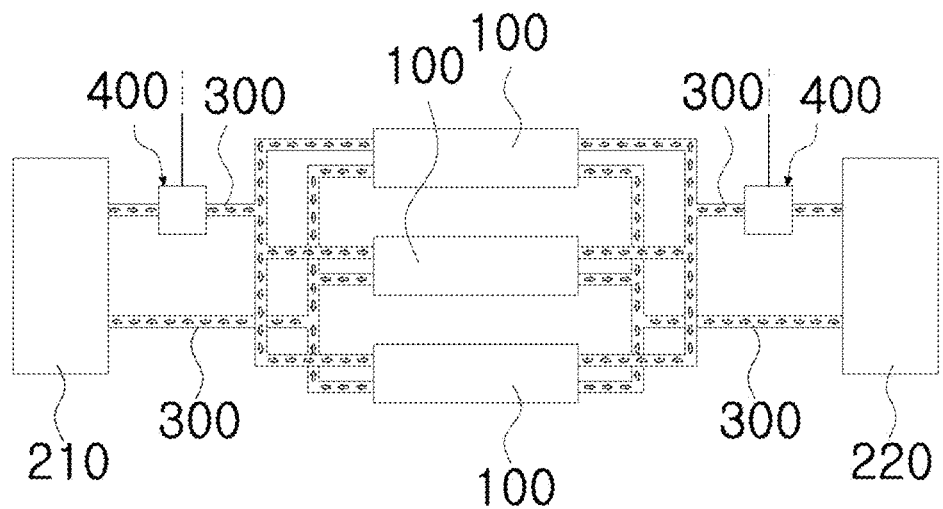
FIG. 8 is a view showing an example in which the electrolyte is moved from the electrolyte tank independently provided in multiple battery cells via the fluid control unit in the redox flow battery having an electrolyte flow path independently provided therein according to the present invention.

FIG. 8 is a view showing an example in which the electrolyte is moved via the electrolyte tank and the fluid control unit independently provided in multiple battery cells in the redox flow battery having an electrolyte flow path independently provided therein according to the present invention.

As shown in FIG. 8, multiple battery cells 100 are provided, and the multiple cells 100 are connected to the anode electrolyte tank 210 and the cathode electrolyte tank 220 via electrolyte flow paths 300. A fluid control unit 400 which receives pressure from the pressure generating unit 20 to be operated is provided in each of the electrolyte flow path 300 connected to the anode electrolyte tank 210 and the electrolyte flow path 300 connected to the cathode electrolyte tank 220.

Thus, when the pressure generated in the pressure generating unit 20 is supplied to a pair of fluid control units 400, each of the fluid control units 400 is operated. The anode electrolyte is circulated through the anode electrolyte tank 210 and the electrolyte flow path 300 and the plurality of battery cells 100, and the cathode electrolyte tank 220 is circulated through the cathode electrolyte tank 220, the electrolyte flow path 300, and the multiple battery cells 100, thereby allowing each of the multiple battery cells 100 to be independently charged and discharged.

According to the design conditions, the redox flow battery having the electrolyte flow path independently provided therein according to the present invention includes a module connection part 30 which electrically connects between multiple battery modules 10 provided in the stack 1.

Figure 9:
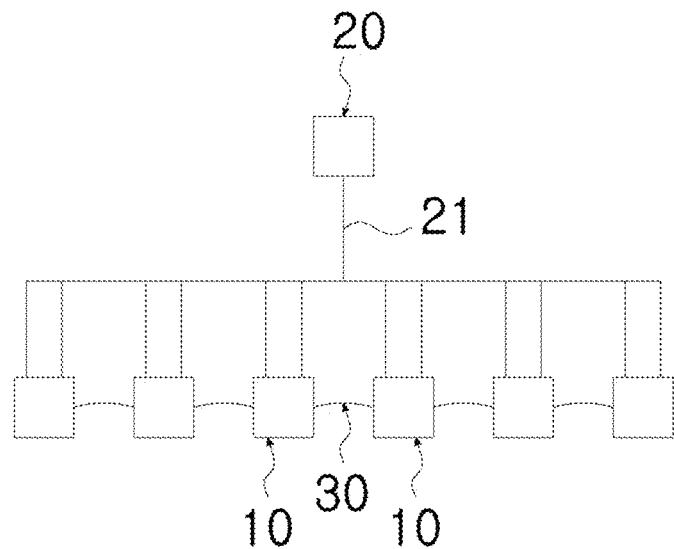
FIG. 9 is a view showing an example in which a module connection part is provided in the redox flow battery having an electrolyte flow path independently provided therein according to the present invention.

Referring to FIG. 9, the module connection part 30 performs a function of allowing the battery modules 10 to electrically communicate with each other by electrically connecting the battery modules 10 to each other.

Herein, the module connection part 30 is preferably made of a material that is electrically conductive, and is used with wires made of aluminum or copper depending on the design conditions.

Further, a wire made of gold or plated with gold may be used to prevent corrosion of the wires, and any conductor may be used as long as it is electrically conductive.

In some cases, the battery modules 10 may be configured in such a manner as to be driven independently without an electrical connection between the battery modules 10, and a desired output may be configured through a serial or parallel connection.

Meanwhile, as a specific component of the fluid supplied from the pressure generating unit 20 (for example, oxygen in the air, etc.) may come into contact with the electrolyte, a problem of lowering the operating efficiency may be caused.

Thus, the redox flow battery having the electrolyte flow path independently provided therein according to the present invention may further include a fluid filter 450 in the fluid transfer pipe 21, so that the specific component of the fluid is selectively removed as described above, as shown in FIG. 10.

The fluid filter 450 is to remove components that lower the performance of the electrolyte, such as oxygen and water and further include a filter for removal of the material affecting the performance of the electrolyte, in addition to the components.

Figure 10:
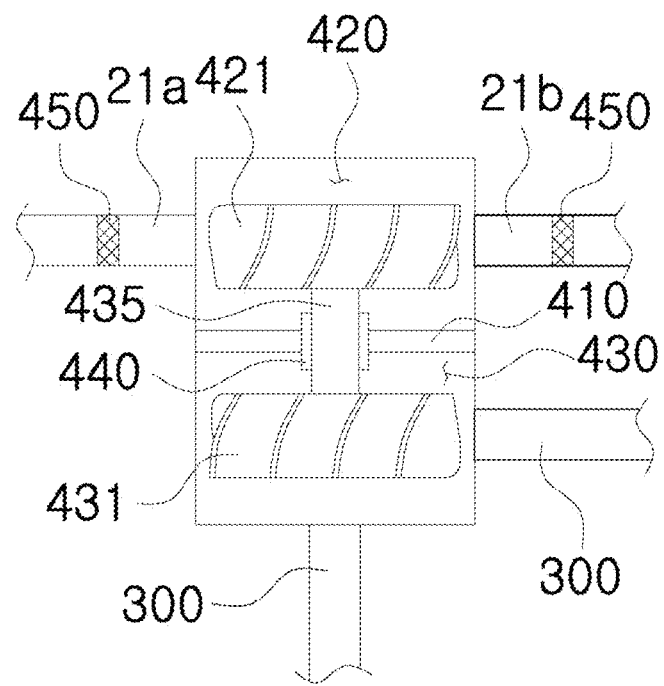
FIG. 10 is a view showing an example in which a fluid filter is provided in the redox flow battery having an electrolyte flow path independently provided therein according to the present invention.

Herein, the fluid filter 450, as shown in FIG. 10, is provided in the fluid transfer pipe 21 or is provided in the fluid control unit 400 or the pressure generating unit 20 which are interconnected by the fluid transfer pipe 21.

According to this configuration, the redox flow battery having the electrolyte flow path independently provided therein according to the present invention is configured so that the multiple battery modules 10 enables circulating the electrolyte independently without any interference or exchanges of electrolyte between the multiple battery modules 10 or some battery modules 10 share the electrolyte tank to circulate the electrolyte, thereby minimizing the generation of shunt current.

In the above description, various embodiments of the present invention have been described and described, but the present invention is not necessarily limited thereto, and a person having ordinary skill in the art to which the present invention pertains will understand that various substitutions, modifications, and changes can be made therein without departing from the technical spirit of the present invention.

INDUSTRIAL APPLICABILITY

The present invention can provide a redox flow battery having an electrolyte flow path independently provided therein which forms a closed circuit consisting of a battery cell, an electrolyte tank, and an electrolyte flow path through which the electrolyte flows and has a fluid control unit provided in the electrolyte flow path for transferring the electrolyte solution from the electrolyte tank to the battery cell, thereby reducing the reaction time, minimizing the occurrence of shunt current, and improving efficiency, and be utilized in the corresponding field.

The invention claimed is:

1. A redox flow battery having an electrolyte flow path independently provided therein, the redox flow battery comprising:
    a plurality of battery modules each including respective ones of a battery cell, an electrolyte tank, an electrolyte flow path, and a fluid control unit,
    wherein each of the plurality of battery modules is configured to be charged and discharged by independently circulating an electrolyte.

2. The redox flow battery of claim 1, further comprising a pressure generating unit configured to transmit pressure to each of the plurality of battery modules.

3. The redox flow battery of claim 1, wherein each of the plurality of battery modules comprises:
    one or more battery cells each having a pair of electrodes divided into a positive electrode and a negative electrode, a membrane interposed between the electrodes, and a bipolar plate stacked on an outer surface of each of the pair of electrodes;
    the electrolyte tank connected to the battery cell and having an anode electrolyte tank for causing an anode electrolyte to be circulated and a cathode electrolyte tank for allowing a cathode electrolyte to be circulated;
    the electrolyte flow path connecting the battery cell and the electrolyte tank; and
    the fluid control unit provided in the electrolyte flow path to control flows of the anode electrolyte and the cathode electrolyte.

4. The redox flow battery of claim 1, wherein the fluid control unit comprises:
    a partition partitioning an internal space;
    a fluid transfer chamber forming one space partitioned by the partition and having a fluid transfer impeller provided therein, the fluid transfer chamber being connected to the pressure generating unit through a fluid transfer pipe; and an electrolyte transfer chamber forming another space partitioned by the partition and having an electrolyte transfer impeller provided therein, the electrolyte transfer chamber being connected to the electrolyte flow path.

5. The redox flow battery of claim 4, wherein the fluid transfer pipe further includes a fluid filter.

6. The redox flow battery of claim 4, wherein the fluid transfer impeller and the electrolyte transfer impeller are connected by a shaft passing through a through hole formed in the partition to share a rotational force.

7. The redox flow battery of claim 6, wherein the fluid control unit is provided such that when a pressure is transmitted from the pressure generating unit to rotate the fluid transfer impeller, the electrolyte transfer impeller connected to the shaft is rotated, and thus the electrolyte flowing through the electrolyte flow path is moved.

8. The redox flow battery of claim 6, wherein the fluid transfer impeller is connected to the electrolyte transfer impeller transferring each of an anode electrolyte and a cathode electrolyte, thereby sharing a rotational force.

9. The redox flow battery of claim 6, wherein the fluid control unit includes a watertight member that seals between an outer circumferential surface of the shaft and the through hole.

10. The redox flow battery of claim 9, wherein the watertight member is made of one or more selected from a bearing or a retainer.

11. A redox flow battery having an electrolyte flow path independently provided therein, the redox flow battery comprising:

one or more battery modules each including respective ones of a battery cell, an electrolyte tank, an electrolyte flow path, and a fluid control unit, wherein each of the one or more battery modules is charged and discharged by independently circulating an electrolyte, wherein the fluid control unit is configured to include:

a partition partitioning an internal space;

a fluid transfer chamber forming one space partitioned by the partition and having a fluid transfer impeller provided therein, the fluid transfer chamber being connected to the pressure generating unit through a fluid transfer pipe; and an electrolyte transfer chamber forming another space partitioned by the partition and having an electrolyte transfer impeller provided therein, the electrolyte transfer chamber being connected to the electrolyte flow path.

* * * * *